Jan. 25, 1966    W. C. MAHLER ET AL    3,230,835
CONTOUR TRACER ATTACHMENT UNIT
Filed June 24, 1963    6 Sheets-Sheet 1
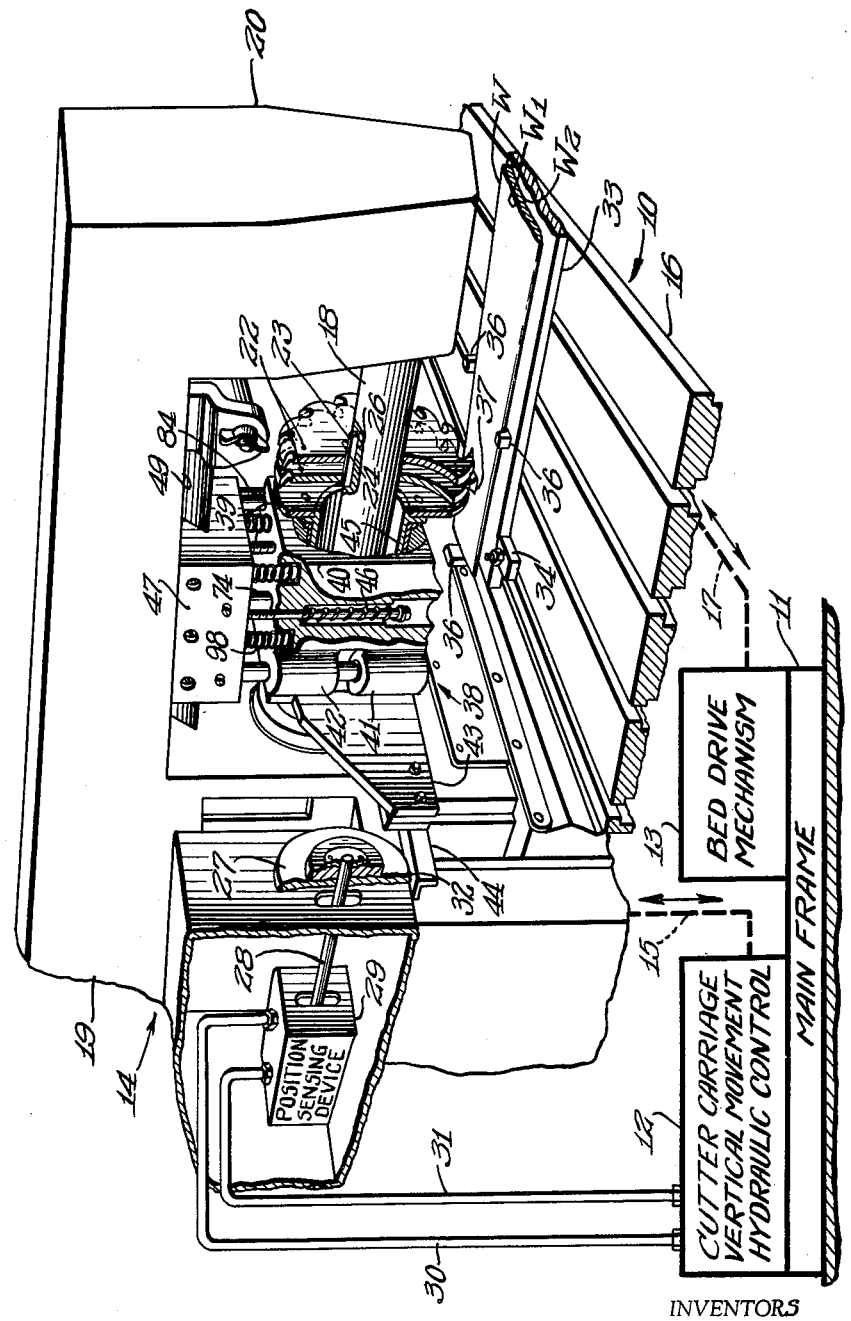
INVENTORS
William C. Mahler
Emerson H. Christian
Benjamin F. Pardoe
by
ATTORNEYS

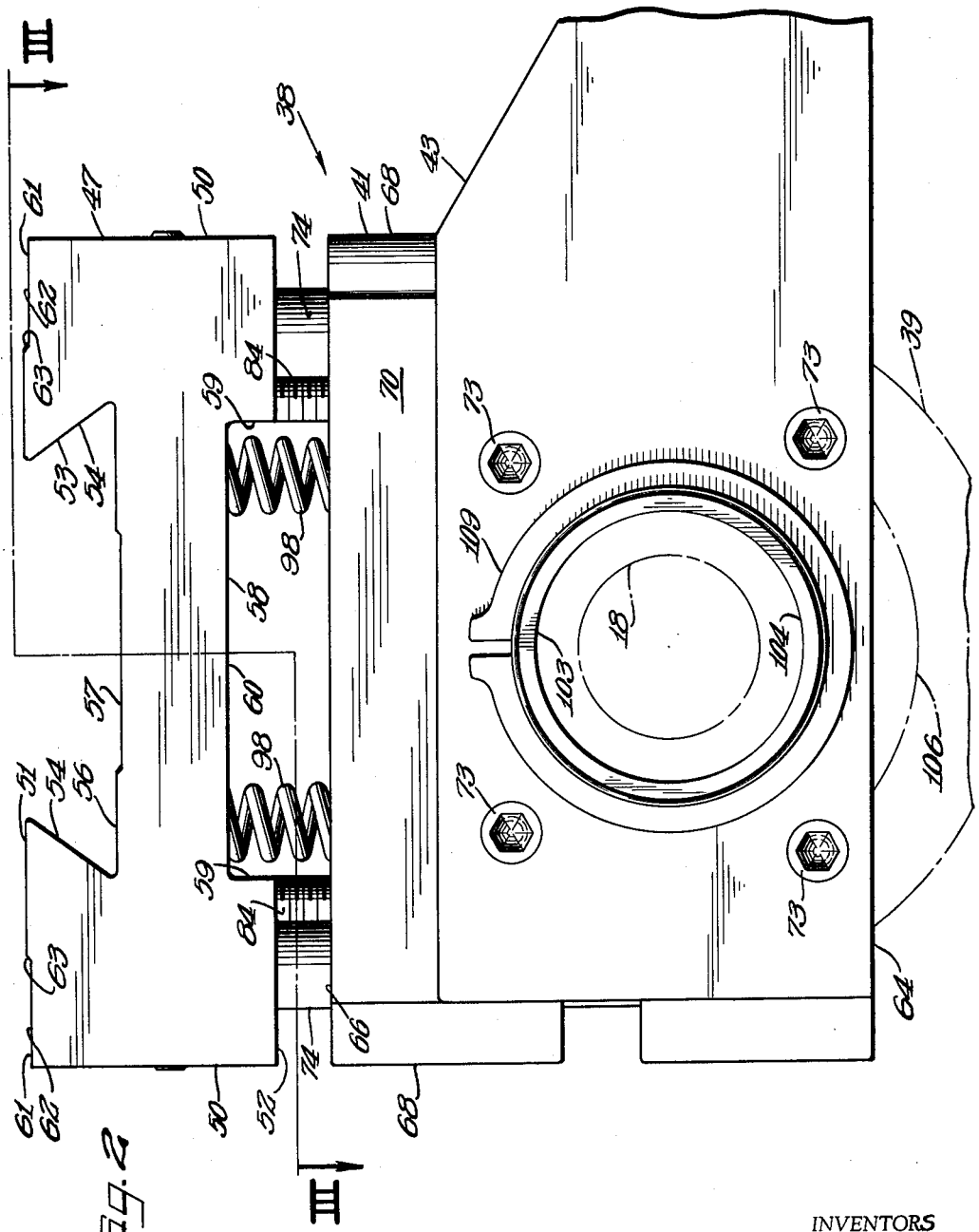

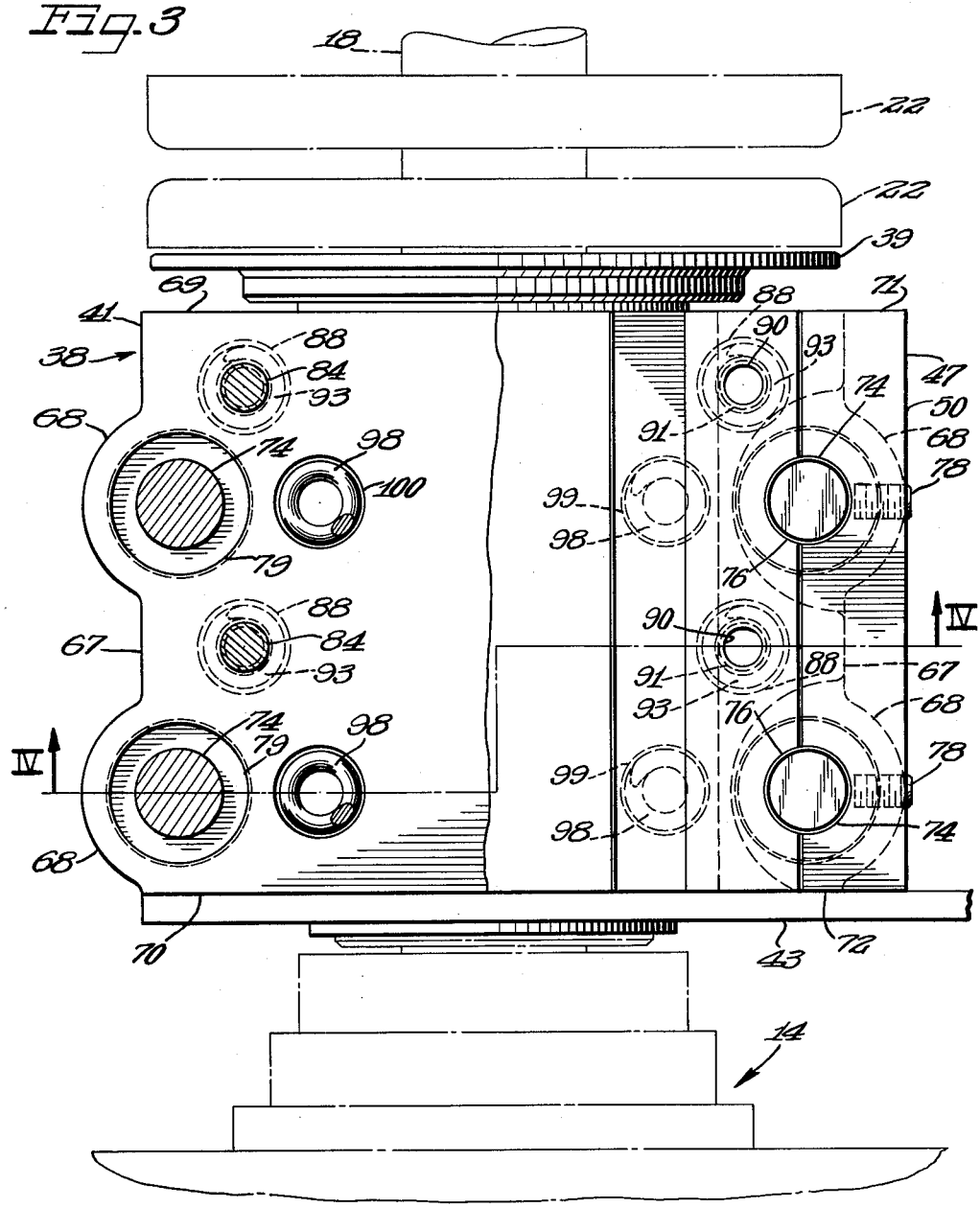

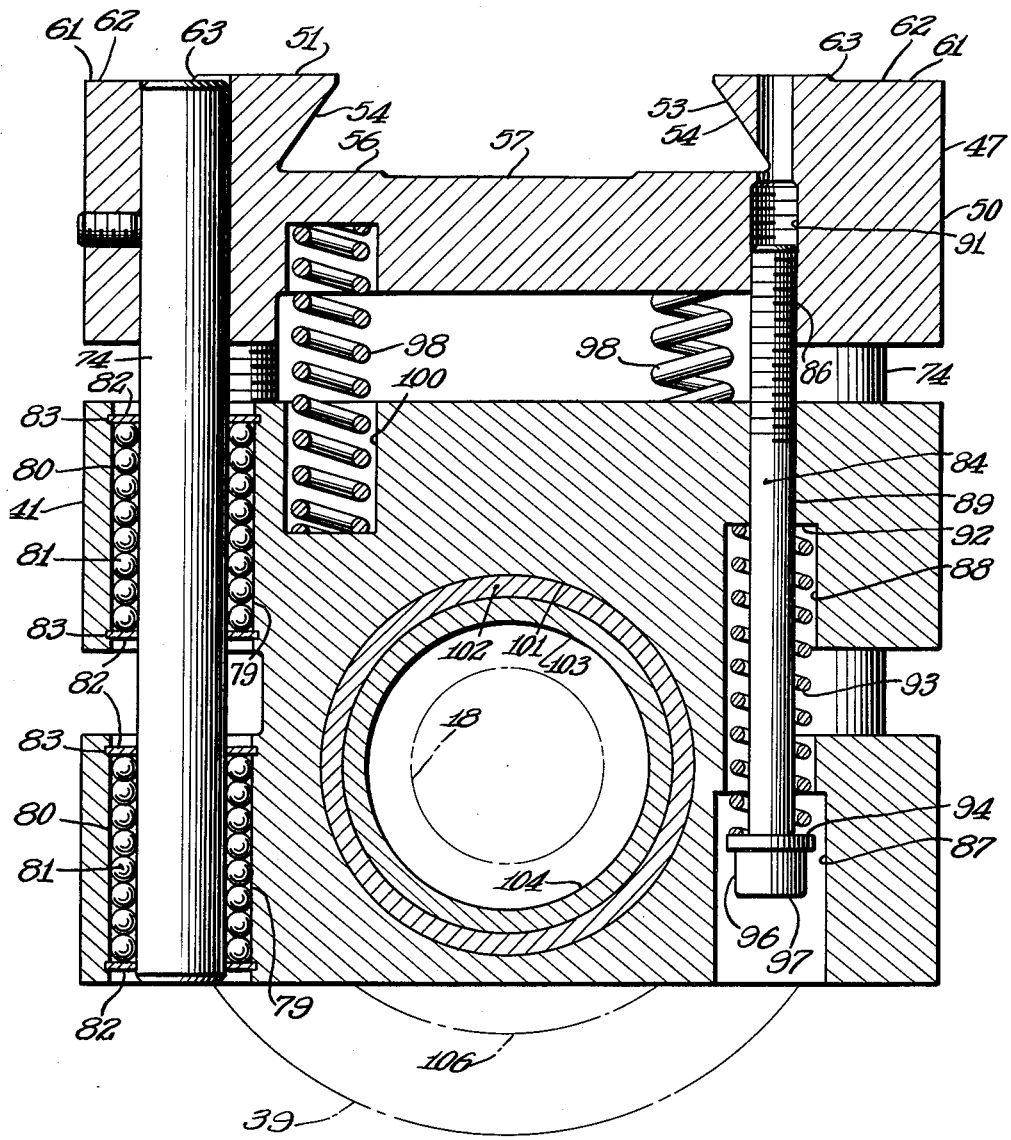

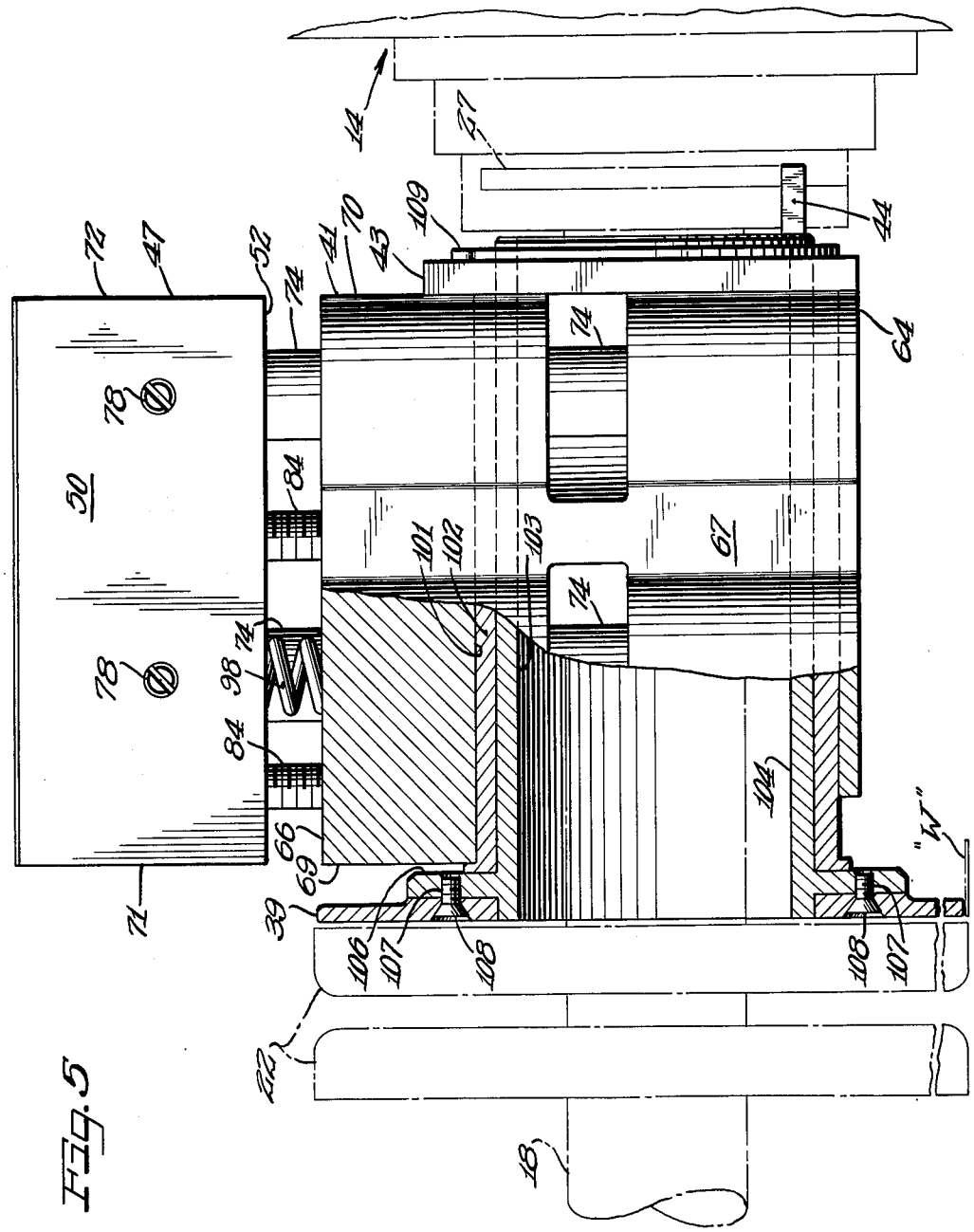

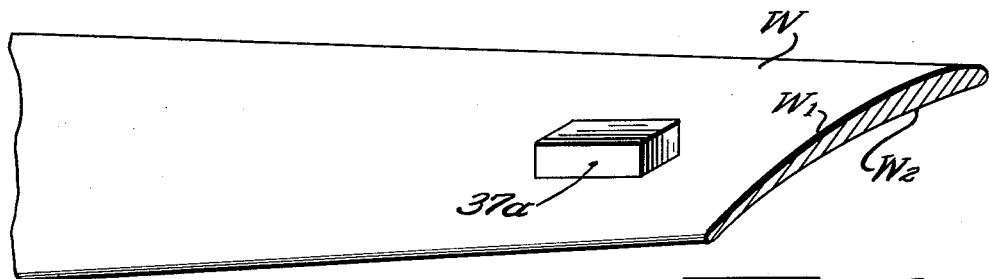
Fig. 6
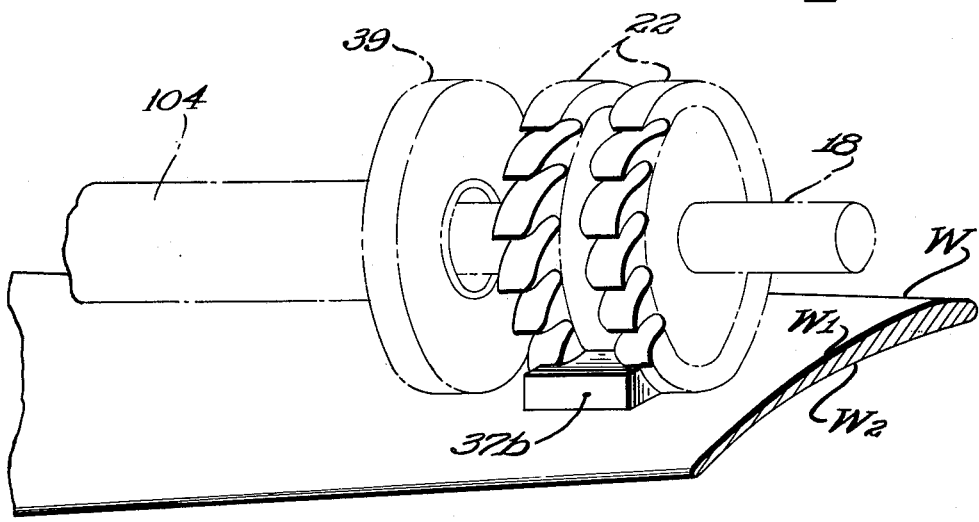
Fig. 7
Fig. 8
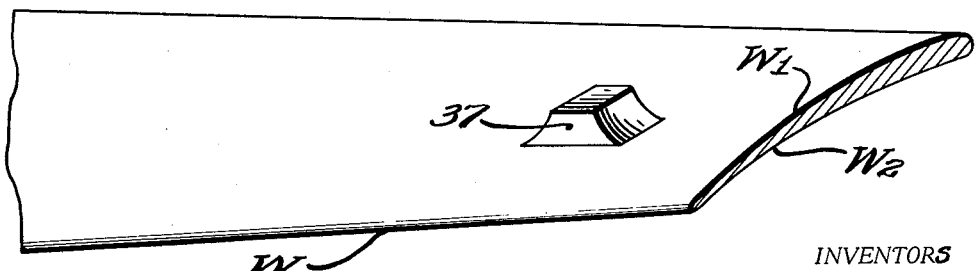
INVENTORS
William C. Mahler
Emerson H. Christian
Benjamin F. Pardoe
ATTORNEYS United States Patent Office 3,230,835
Patented Jan. 25, 1966

3,230,835
CONTOUR TRACER ATTACHMENT UNIT
William C. Mahler, Chesterland, Emerson H. Christian, Parma, and Benjamin F. Pardoe, Willoughby, Ohio, assignors to TRW Inc., a corporation of Ohio
Filed June 24, 1963, Ser. No. 289,968
5 Claims. (Cl. 90—13.5)

This invention relates to a tracer type milling machine or a similar tracer type material removing machine and particularly to a follower arrangement which makes it possible to reliably machine parts to a high degree of accuracy, eliminating the waste of materials in machines of the prior art. The arrangement of this invention is rugged and comparatively simple in construction and can be readily applied to existing material removing machines as an attachment.

Tracer type milling machines are known in which a tracer element, usually a roller, disc engages the surface of a pre-formed or pre-machined template to control, through a hydraulic system or the like, the movement of a tool such as a rotating cutter. Such machines are generally satisfactory but it has been found that serious difficulties and inaccuracies are encountered in the milling of certain types of parts, particularly turbine blades or the like, where certain surfaces must be milled to the same shape as other surfaces with a high degree of accuracy.

This invention was evolved with the general object of overcoming such difficulties and inaccuracies.

According to this invention, a follower member preferably in the form of a follower disc is arranged to engage one surface portion of a part and to control through the control system of a milling machine the movement of a cutter to cut another surface portion of the part to the same contour and with a fixed dimensional relation between the two surfaces of the part. This feature has many applications, one important application being in the milling of spacer fins on long, thin turbine blades, such spacer fins being provided at intermediate portions of the blades to engage similar fins on adjacent blades to rigidify and to maintain the proper spacing between the blades when assembled on a turbine wheel.

Another important feature of this invention is in the engagement of the follower element with a surface of the part with a relatively high pressure to ensure accurate control. This feature is also particularly important in the milling of thin turbine blades in that the blade is firmly held against vibration movements during the cutting operation.

A further important feature of the invention is in an arrangement for supporting the follower element and connecting it to the control system of the milling machine. This arrangement can be readily constructed and installed as an attachment to an existing milling machine or similar material removing machine.

Still another feature of this invention is in the provision of an opposed spring arrangement which makes it possible to readily adjust the pressure exerted between the follower element and the surface of the part.

Many other features, advantages and additional objects will become manifest to those versed in the art from the detailed description of the invention which follows and the accompanying sheets of drawings in which a preferred embodiment of the tracer type milling machine incorporating the principles of the present invention is shown by way of illustrative example.

On the drawings:

FIGURE 1 is a fragmentary perspective view of a tracer type milling machine embodying the present invention;

FIGURE 2 is a side elevational view of the follower attachment of the present invention with portions cut away, and with portions illustrated in phantom;

FIGURE 3 is a top view of the follower attachment of the present invention taken substantially along lines III—III of FIGURE 2 and showing portions of the milling machine of FIGURE 1 in phantom;

FIGURE 4 is a cross-sectional view taken along lines IV—IV of FIGURE 3;

FIGURE 5 is an elevational view of the front side of the follower attachment of the present invention showing portions in section and including portions of the milling machine of FIGURE 1 in phantom.

FIGURE 6 is a fragmentary perspective view of an exemplary workpiece having a finished surface and an unfinished surface which is to be machined with respect to the contour of the finished surface;

FIGURE 7 is similar to FIGURE 6 but shows in broken lines a pair of cutters and a follower member as they traverse the top surface of the workpiece during a cutting operation; and FIGURE 8 is similar to FIGURE 6 but shows the configuration of a spacer fin on the workpiece after completion of the cutting operation.

As shown on the drawings:

Although the principles of the present invention are of utility in any material removing machine incorporating a tracer system for automatically controlling the movement of a cutter a particularly useful application is made to milling machines and an illustrative embodiment herein shown consists of a horizontal spindle tracer type milling machine arranged for machining a workpiece consisting of a long, thin turbine blade.

A fragmentary, partially diagrammatic view of a milling machine embodying the principles of the present invention is shown generally at 10 in FIGURE 1 wherein is illustrated a horizontal spindle tracer type milling machine comprising a main frame 11, a cutter carriage control mechanism 12 mounted rigidly on the frame 11 and a bed drive mechanism 13 mounted rigidly on the frame 11 adjacent the cutter carriage control mechanism 12.

A cutter carriage is shown generally at 14 and as represented by the dashed line 15 is slidably mounted for relative vertical movement on the cutter carriage control mechanism 12. A horizontally disposed workholder or bed is shown generally at 16 and as represented by the dashed line 17 is slidably mounted for relative horizontal reciprocal movement on the bed drive mechanism 13. A horizontally disposed cutter holder or spindle shaft 18 is journalled for rotation on a pedestal member 19 and a cutter head 20 of the cutter carriage 14 and may be driven by any suitable means such as an electric motor (not shown). A pair of cutters 22, 22 are mounted on the spindle shaft 18 and are secured thereto for corotation therewith by means of a key 23 which is inserted into corresponding keyways 24 and 26 formed respectively in the cutters 22, 22 and the spindle shaft 18.

The axis of the spindle shaft 18 transversely overlies the longitudinal axis of the bed 16 and consequently the shaft 18 and the bed 16 are adapted to move in mutually relative transverse axes.

In order to control vertical rise and fall movements of the cutter carriage 14 and correspondingly the cutters 22, 22 of the tracer type milling machine 10, a tracer roller disc as shown at 27 is mounted for slight relative vertical movement on the cutter carriage 14 and is operatively connected to the cutter carriage vertical movement hydraulic control mechanism 12. The mechanism 12 incorporates a hydraulic system or the like (not shown) to impart rise and fall movements to the cutter carriage 14 relative to the frame 11 and the bed 13 in response to corresponding rise and fall movements of the tracer roller disc 27, which engages and controls the setting of a hydraulic position sensing valve 29 which is fixedly connected to the cutter carriage 14 for movement therewith. The valve 29 is hydraulically connected to the hydraulic control mechanism 12 by means of flexible pressurized fluid conduits 30 and 31. Spring means (not shown) are provided within the position sensing valve 29 for imparting a constant vertically downwardly directed force of approximately 6 ounces to the disc 27. An external vertically upwardly directed force of approximately 6 ounces which may be applied to a bottom portion 32 of the tracer disc 27 will exactly compensate for the spring bias applied to the tracer disc 27 and retain the disc in a stationary position relative to the cutter carriage 14 and will secondarily retain the position sensing valve 29 to which the disc 27 is connected in a closed position.

A slight reduction to less than 6 ounces in the external force applied to the bottom portion 32 of the disc 27 will cause the disc to move slightly vertically downwardly, thereby causing the valve 29 to move in one direction so that the hydraulic system (not shown) incorporated in the control mechanism 12 will operate to move the cutter carriage 14 vertically downwardly. This downward movement of the cutter carriage 14 will continue until once again the upwardly directed external force applied to the disc 27 equals 6 ounces thereby moving the valve 29 to a closed position. Conversely, if an upwardly directed external force which exceeds 6 ounces is applied to the disc 27, the disc will be urged vertically upwardly, thereby causing the valve 29 to move in a second direction so that the hydraulic system will operate to move the cutter carriage 14 vertically upwardly. This upward movement of the cutter carriage 14 will continue until the external force on the disc 27 is reduced to 6 ounces, at which time the valve 29 will close.

FIGURE 1 illustrates a workpiece "W" such as a turbine blade positioned for a machining operation and carried on the bed 17 by means of a strap 33 which is securely fastened to the bed 17 by means of suitable clamps as shown at 34. The strap 33 comprises a plurality of upstanding bosses as at 36 for retaining the workpiece "W" on the strap as the workpiece is subjected to a cutting action from the cutters 22, 22.

The embodiment of the workpiece "W" illustrated in the drawing constitutes a long, thin turbine blade. As illustrated, the workpiece "W" has precisely finished airfoil surfaces on opposite sides "$W_1$" and "$W_2$", which have been generated in a previous machining, forging or the like operation.

Normally when turbine blades are assembled in a rotor or wheel, they are supported only at the hub and at the outer rim of the wheel. However, in the case of large jet-type aircraft engines and other large centrifugal equipment it has been determined that because of the length of the blades additional rigidifying and spacing support is advantageous intermediate the ends of the blades for maintaining proper positioning of the blades. This spacing effect can be accomplished by means of spacer fins provided at intermediate portions of the blades to engage similar fins on adjacent blades when the blades are assembled in a wheel, thereby forming a circumferentially continuous support mid-way of the blade foil. The contour of a spacer fin must be machined so as to correspond specifically to the contour of the individual turbine blade upon whose surface it is being generated. That is, the shape of the spacer fin should, in some respects, be directly influenced and controlled by the contour of its respective blade.

Prior to the present invention, a blade was produced by generating an air foil contour on opposite faces of the workpiece while providing for an embossment (or more than one) along the length of the blade to be subsequently machined to provide a finished spacer fin. The contour of the fin was generated on a tracer type milling machine 10 of the type known in the art. The movement of the carriage support 14 (and the cutters) for generating this surface was controlled by the tracer roller disc 27 arranged to engage a pre-machined template of a standard fin which was clamped to the machine bed to move with the blade and thus control rise and fall movements of the tracer disc and the cutters to generate a predetermined contour for the fin.

This method of generating the engaging faces of the spacer fins has the disadvantage in that although the contour of the individual spacer fin must be specific to the contour of the individual blade upon which it is being generated, the blades themselves do not all have precisely the same airfoil contour. Consequently, the generation of the contour of a fin from a standard template when the airfoil contour of all blades is not identical results in excessive waste and scrap of improperly formed blades.

The problem of generating the spacer fins on turbine blades specific in detail to the airfoil contour of each respective turbine blade was the problem to which we addressed ourselves in evolving the present invention. The turbine blade "W" of FIGURE 1 is provided with a spacer fin as at 37 which is to be machined precisely complementarily to the airfoil contour of the blade face "$W_1$". In accordance with the principles of the present invention, we provide a follower assembly or attachment illustrated generally at 38 having a circular follower member or disc 39 positioned adjacent the cutters 22, 22 and securely mounted to one end 40 of a slide housing 41. On an opposite end 42 of the slide housing 41 a carrier plate 43 is mounted securely thereto and has extending therefrom a force transmitting beam 44 positioned to engage the bottom portion 32 of the tracer roller disc 27.

The follower disc 39, the slide housing 41 and the carrier plate 43 are assembled and move as a unit (no lost motion between parts) and may also move relative to the spindle shaft 18. The slide housing 41 is resiliently suspended by means of helical springs 46 from a V-bracket 47 which depends from a rail 48 rigidly connected to an underside 49 of the cutter carriage 14. The follower disc 39, the slide housing 41 and the carrier plate 43 are horizontally apertured as at 45 to permit the spindle shaft 18 to extend therethrough without interference therewith, and the aperture is dimensioned sufficiently oversized with respect to the diameter of the spindle shaft 18 to provide for substantial movement of the follower disc 39 and its associated parts without engaging the spindle shaft 18.

Referring to FIGURES 6, 7 and 8 in addition to FIGURE 1, as the workpiece "W" traverses the underside of the cutters 22, 22 in response to horizontal movement of the bed 17 the circularly shaped follower disc 39, which has a diameter somewhat larger than the diameter of the cutters 22, 22, engages the face "$W_1$" of the workpiece "W" and is subjected to rise and fall movements which correspond exactly to the contour of the face "$W_1$" immediately adjacent the fin 37. Such rise and fall movements are transmitted precisely to the beam 44, which in turn transmits such movements to the tracer roller disc 27 for effecting corresponding vertical movement to the cutter carriage 14 and the cutters 22, 22 relative to the workpiece "W." It is therefore apparent that the present invention provides a means for controlling vertical rise and fall movements of the cutters of a tracer type milling machine so that the fin 37 may be machined specific to the contour of its respective blade "W" from its original configuration as shown in FIGURE 6 at 37a to its final configuration as shown in FIGURE 8 at reference numeral 37.

An important feature of the present invention resides in the resilient mounting mechanism of the slide housing 41 which permits the follower disc 39 to engage the surface "$W_1$" of the workpiece "W" with relatively high pressure to minimize vibration movements of the workpiece "W" as it is being subjected to cutting action and to follow exactly the contour of the face "$W_1$." In prior art milling machines, the "neutral force" for the tracer roller disc 27 (that is, the amount of upwardly directed force which, if applied to the bottom portion 32 of the disc 27 exactly compensates for the downward bias of the disc and results in an absence of movement of the cutter carriage 14) may be in the order of approximately 6 ounces. Deviations to this "neutral force" in terms of ounces is sufficient to move the disc 27 and correspondingly the cutters 22, 22, but it is apparent that if the follower disc 39 were to exert a force in terms of ounces on the face "$W_1$" of the workpiece "W" inaccuracies in cutting could result due to vibration movements of the workpiece and the inertia inherent in the follower disc 39 and its associated parts.

In accordance with the present invention and in a manner to be described in detail hereinafter, the helical springs 46 connecting the slide housing 41 to the V-bracket 47 are adjustably adaptable to be put into various degrees of compression, thereby permitting an adjustable relatively high pressure to be exerted by the follower disc 39 on the workpiece "W" while transmitting forces in terms of ounces to the tracer disc 27 of an existing prior art machine without requiring modification of the "neutral force" setting of such a machine.

Referring to FIGURES 2 and 3, the V-bracket 47 of the follower assembly or attachment 38 is particularly characterized as having a pair of parallel, vertically upstanding side walls 50, 50 and horizontal top and bottom walls 51 and 52 respectively. An inverted V-portion shaped slot 53 is formed in the top wall 51 and extends parallel to the axis of the spindle shaft 18 for slidably receiving the rail 48. The slot 53 is defined by a pair of upwardly converging side walls 54, 54 and a horizontally extending bottom wall 56 having an axially extending groove 57 formed therein. A bottom-opening axially extending channel portion 58 is formed in the bottom wall 52 and is defined by a pair of vertically extending side walls 59, 59 and a horizontal top wall 60. The top wall 51 of the V-bracket 47 is further characterized by a pair of depressed shoulder portions 61, 61 which are more particularly defined by a pair of inwardly directed surfaces 62, 62 and angularly downwardly extending transition surfaces 63, 63.

The slide housing 41 comprises a horizontally extending bottom wall 64 and a top wall 66 formed parallel to the bottom wall 64 and situated in vertical spaced relation to the bottom wall 52 of the V-bracket 47 when the follower assembly 38 is in an assembled condition as illustrated in FIGURE 2. The slide housing 41 also defines a pair of upstanding side walls 67, 67 which are particularly characterized as forming respectively a pair of cylindrically shaped vertically upstanding enlarged portions or embossments 68, 68. A pair of end walls 69 and 70 are disposed in vertical alignment with corresponding end walls 71 and 72 of the V-bracket 47, and the carrier plate 43 is securely mounted to the end wall 70 of the slide housing 41 by means of a plurality of flat head socket cap screws as at 73. As illustrated, the carrier plate 43 is positioned transverse to the axis of the spindle shaft 18 and projects substantially radially outwardly from the spindle shaft 18 in the direction of the tracer roller disc 27 of the milling machine 10 as shown in FIGURE 1.

Referring to FIGURES 3 and 4, a plurality of cylindrically shaped vertically extending guide posts as at 74 are received in complementarily shaped passageways 76 which extend vertically through the V-bracket 47. The guide posts 74 are positioned such that their top ends 77 are coplanar with the shoulder portions 61, 61 and are held against vertical movement in the passageway 76 by suitable means such as socket head set screws as at 78.

The guide posts 74 project downwardly from the V-bracket 47 into respective concentrically aligned enlarged diameter passageways as at 79 formed in the slide housing 41. In accordance with the principles of the present invention, the slide housing 41 is adapted to move vertically relative to the stationary V-bracket 47 in response to rise and fall movements of the follower disc 39, but it is essential in order for the slide housing 41 to transmit precise movements to the tracer roller disc 27 that the slide housing 41 be incapable of any movement other than pure vertical rectilinear movement. In order to minimize frictional resistance for easy vertical movement and to preclude any angular movement of the slide housing 41 relative to the V-bracket 47, the guide posts 74 are received in precisely machined ball bushings as at 80 inserted into the passageway 79 which are formed within the slide housing 41. The ball bushings 80 comprise a plurality of uniformly dimensioned highly polished balls as at 81 confined within the passageway 79 by means of retaining rings as at 82 inserted into annularly shaped ring grooves as at 83 formed in the slide housing 41.

In order to maintain the slide housing 41 in depending assembly relative to the V-bracket 47 a plurality of elongated screws as at 84 having threaded portions as at 86 are inserted through concentrically aligned apertures 87, 88 and 89 in the slide housing 41 and are received in concentrically aligned complementarily shaped apertures 90 formed in the V-bracket 47 and threaded as at 91.

The diameters of apertures 89 are less than the diameters corresponding adjacent apertures 88 and form circumferentially continuous inturned shoulder portions as at 92. Compression springs 93 are inserted respectively in apertures 88 and at one end thereof abut shoulder portions 92 and at an opposite end thereof abut radially outwardly extending flange portions or washers 94 formed respectively at lower portions 96 of the screws 84.

In order to facilitate turning of screws 84 to adjustably thread the screws into the V-bracket 47 for selectively increasing or decreasing spring pressure of the springs 93, the lower portions 96 of the screws 84 form socket head caps as at 97 for receiving a turning tool such as a socket wrench.

In order to provide greater spring compression between the slide housing 41 and V-bracket 47 additional compression springs as at 98 are disposed within mutually facing, cylindrically shaped, concentrically aligned cavities 99 and 100 formed respectively in the V-bracket 47 and the slide housing 41. It is apparent that an adjustment of the screws 84 to thread the screws more deeply into the V-bracket 47 will act to produce greater spring compression in the springs 93 and correspondingly in the springs 98. Such an adjustment will increase the external force necessary to move the slide housing 41 vertically upwardly toward the V-bracket 47, and translated into terms of function of the follower disc 39, will result in an increased force applied to the workpiece "W" as the follower disc 39 engages and transverses the top surface "$W_1$" thereof. Consequently as a result of this pre-loaded compression spring feature of the present invention, the force applied to the workpiece "W" by the follower disc 39 can be selectively adjustably controlled by the setting of the screws 84. Such force also adds to reduce vibration of the workpiece "W" during a cutting operation.

It has been determined that a force of from 15 to 25 pounds applied by the follower disc 39 to the workpiece "W" is often desirable in machining spacer fins of turbine blades. This force, which reduces vibration movements of the blade and provides for precise following of the disc 39 over the contoured surface of the blade and consequently precise movements of the cutters 22, 22 in response thereto, does not require special setting of the "neutral force" applied to the tracer roller disc 27 of prior art milling machines since the compression springs 93 and 98, in any degree of adjustment, automatically compensate for all vertical forces applied to the slide housing 41 except that force which is applied by the tracer disc 27.

For example, assume that the compression springs 93 and 98 have been adjusted such that if the lower edge of the follower disc 39 is raised vertically to an elevation corresponding substantially to the elevation of the top surface "W₁" of the workpiece "W" the upward force on the follower disc 39 will range from about 15 to 25 pounds. Further, assume that a turbine blade "W" having an unfinished spacer fin 37 is clamped to the bed 16 of the milling machine 10 for machining of the top surface of the spacer fin 37. As the milling machine 10 is put into operation so that the fin 37 moves rectilinearly past the cutters 22, 22, the follower disc 39 will engage the leading edge of the top surface "W₁" of the workpiece "W." Assuming the airfoil contour of the blade is concave such as to urge the follower disc vertically upwardly, the disc will resist upward movement until the compression of the springs 93 and 98 has been overcome. The follower disc 39, the slide housing 41 and the carrier plate 43 will then move slightly vertically upwardly, following the contour of the surface of the blade, and as an incremental upward movement of the carrier plate 43 takes place, a light force is applied to the bottom portion 32 of the tracer roller disc 27, which effectively raises the cutter carriage 14 and the V-bracket 47 accordingly so as to maintain a relatively constant force applied by the follower disc 39 to the surface of the workpiece "W" as the follower disc traverses the entire width of the workpiece and consequently the generated surface of the spacer fin will bear a direct relation to the contour of the top surface "W₁" of the blade.

Referring now to FIGURES 4 and 5, the slide housing 41 forms a cylindrically shaped axially extending aperture 101 which receives a similarly shaped bushing 102 which in turn receives a tubular sleeve member 103. The inner diameter of the sleeve 103 as defined by an inner wall 104 is substantially greater than the diameter of the spindle shaft 18, thereby permitting sufficient vertical movement of the slide housing 41 about the spindle shaft 18 without interference or engagement therewith.

An annularly shaped, circumferentially continuous flange portion 106 extends radially outwardly from the sleeve 103 and forms a plurality of threaded bolt holes as at 107 adapted to receive suitably threaded screws such as flat head socket cap screws as at 108 to securely fasten the follower disc 39 to the sleeve 103.

As best illustrated in FIGURE 5, an elementary or retaining ring 109 is mounted about the sleeve 103 outboard of the carrier plate 43 to maintain the sleeve 103 and the bushing 102 in fixed assembly on the slide housing 41.

Thus there has been provided by the present invention a tracer type milling machine adapted to machine parts to a high degree of accuracy, and a follower contour tracer attachment adapted to engage one surface of a workpiece and to control the movement of a cutter to cut another surface of the workpiece to the same contour and with a fixed dimensional relation between the two surfaces of the workpiece. The construction of the present invention is rugged and will withstand heavy use, is comparatively simple in design and can be readily applied to existing milling machines as an attachment thereto.

It is apparent that the follower assembly 38 of the present invention is suitable for use on milling machines or the like of the tracer type adapted to provide relative movement between the cutter and the bed similar to that illustrated in the drawings, but providing, for example, a stationary cutter supporting arm and a bed supported for movement in both a horizontal and a vertical axis. In such an arrangement, the tracer disc would be mounted integral with the bed support and the length of the carrier plate 43 would be extended in the direction of the longitudinal axis of the bed to remain in contact therewith as the bed moves through its horizontal travel.

It will also be apparent that the present invention finds utility even where a standard pre-formed template is mounted on the bed for controlling movement of the tracer disc, as is known in the prior art. In this respect the follower disc 39 is adapted to engage the pre-machined surface of a template with a relatively high pressure, while transmitting rise and fall movements to the tracer disc in terms of ounces. Such arrangement may provide greater precision in following the contour of the template without requiring a re-setting of the "neutral force" of a tracer disc of a prior art machine.

Although minor modifications might be suggested by those versed in the art, it should be understod that I wish to embody within the scope of the patent warranted hereon all such modifications as reasonably come within the scope of my contribution to the art.

We claim as our invention:

1. In a material removing machine having a rotatable tool for generating a surface on a workpiece, a spindle shaft for carrying the tool, a cutter carriage rotatably supporting the spindle shaft, a bed for supporting a pre-formed article and a workpiece, means including a frame for supporting said cutter carriage and said bed for movement along two mutually transverse axes, and means including a tracer device for controlling movement of the carriage along one of said axes, the axes of rotation of said spindle shaft lying transverse to each of said previously mentioned axes, the improvement for operating the tracer device to control movement of the cutter along said one of said axes according to the configuration of the pre-formed article, said improvement comprising,
    a bracket fixedly supported from said carriage for movement therewith and having guideposts depending therefrom along said one of said axes,
    a slide housing,
    means including spring means for slidably supporting said housing from said bracket,
    means defining passageways in said slide housing for receiving said guideports to restrict relative movement of said housing and said bracket along only said one of said axes,
    a follower disc firmly affixed to said housing and having a portion thereof situated adjacent said cutter and intersecting said one of said axes for engaging said article and for moving in response to the configuration of said article,
    means including screw means in said housing for adjustably selectively increasing the pressure of said spring means towards said follower disc in pressing relation against said pre-formed article, and
    a carrier plate firmly affixed to said housing and engageable with said tracer device for transmitting movements of said housing along said one of said axes to said tracer device.

2. In a material removing machine having a rotatable tool for generating a surface on a workpiece, a spindle shaft for carrying the tool, a cutter carriage rotatably supporting the spindle shaft, a bed for supporting a pre-formed article and a workpiece, means including a frame for supporting said cutter carriage and said bed for movement along two mutually transverse axes, and means including a tracer device for controlling movement of the carriage along one of said axes, the axes of rotation of said spindle shaft lying transverse to each of said previously mentioned axes, the improvement for operating the tracer device to control movement of the cutter along said one of said axes according to the configuration of the pre-formed article, said improvement comprising,
    a bracket fixedly supported from said carriage for movement therewith and having guideposts depending therefrom along said one of said axes,
    a slide housing,
    means for slidably supporting said housing from said bracket,
    means defining passageways in said slide housing for receiving said guideposts to restrict relative movement of said housing and said bracket along only said one of said axes,
    a follower disc firmly affixed to said housing and having a portion thereof situated adjacent said cutter and intersecting said one of said axes for engaging said article and for moving in response to the configuration of said article,
means for urging said follower disc in pressing relation against said pre-formed article, and
a carrier plate firmly affixed to said housing and engageable with said tracer device for transmitting movements of said housing along said one of said axes to said tracer device.

3. In a material removing machine having a rotatable tool for generating a surface on a workpiece, a spindle shaft for carrying the tool, a cutter carriage rotatably supporting the spindle shaft, a bed for supporting a pre-formed article and a workpiece, means including a frame for supporting said cutter carriage and said bed for movement along two mutually transverse axes, and means including a tracer device for controlling movement of the carriage along one of said axes, the axes of rotation of said spindle shaft lying transverse to each of said previously mentioned axes, the improvement for operating the tracer device to control movement of the cutter along said one of said axes according to the configuration of the pre-formed article, said improvement comprising,
a bracket fixedly supported from said carriage for movement therewith and having guideposts depending therefrom along said one of said axes,
a slide housing adapted to allow said spindle shaft to project therethrough with sufficient clearance to enable said housing to move relative to said shaft,
means for slidably supporting said housing from said bracket,
means defining passageways in said slide housing for receiving said guideposts to restrict relative movement of said housing and said bracket along only said one of said axes,
a follower disc firmly affixed to said housing and having a portion thereof situated adjacent said cutter and intersecting said one of said axes for engaging said article and for moving in response to the configuration of said article, means for urging said follower disc in pressing relation against said pre-formed article, and
a carrier plate firmly affixed to said housing and engageable with said tracer device for transmitting movements of said housing along said one of said axes to said tracer device.

4. In a material removing machine having a rotatable tool for generating a surface on a workpiece, a spindle shaft for carrying the tool, a cutter carriage rotatably supporting the spindle shaft, a bed for supporting a pre-formed article and a workpiece, means including a frame for supporting said cutter carriage and said bed for movement along two mutually transverse axes, and means including a tracer device for controlling movement of the carriage along one of said axes, the axes of rotation of said spindle shaft lying transverse to each of said previously mentioned axes, the improvement for operating the tracer device to control movement of the cutter along said one of said axes according to the configuration of the pre-formed article, said improvement comprising,
a bracket fixedly supported from said carriage for movement therewith and having guideposts depending therefrom along said one of said axes,
a slide housing,
means for slidably supporting said housing from said bracket,
means defining passageways in said slide housing for receiving said guideposts to restrict relative movement of said housing and said bracket along only said one of said axes,
a follower disc firmly affixed to said housing and having a portion thereof situated adjacent said cutter and intersecting said one of said axes for engaging said article and for moving in response to the configuration of said article,
means for adjustably urging said follower disc in pressing relation against said pre-formed article, and
a carrier plate firmly affixed to said housing and engageable with said tracer device for transmitting movements of said housing along said one of said axes to said tracer device.

5. In a material removing machine having a rotatable tool for generating a surface on a workpiece, a spindle shaft for carrying the tool, a cutter carriage rotatably supporting the spindle shaft, a bed for supporting a pre-formed article and a workpiece, means including a frame for supporting said cutter carriage and said bed for movement along two mutually transverse axes, and means including a tracer device for controlling movement of the carriage along one of said axes, the axes of rotation of said spindle shaft lying transverse to each of said previously mentioned axes along said one of said axes, the improvement for operating the tracer device to control movement of the cutter along said one of said axes according to the configuration of the pre-formed article, said improvement comprising,
a bracket fixedly supported from said carriage for movement therewith and having guideposts depending therefrom along said one of said axes,
a slide housing adapted to allow said spindle shaft to project therethrough with sufficient clearance to enable said housing to move relative to said shaft,
means including spring means for slidably supporting said housing from said bracket,
means defining passageways in said slide housing for receiving said guideposts to restrict relative movement of said housing and said bracket along only said one of said axes,
a follower disc firmly affixed to said housing and having a portion thereof situated adjacent said cutter and intersecting said one of said axes for engaging said article and for moving in response to the configuration of said article,
means including screw means in said housing for adjustably selectively increasing the pressure of said spring means towards said follower disc in pressing relation against said pre-formed article, and
a carrier plate firmly affixed to said housing and engageable with said tracer device for transmitting movements of said housing along said one of said axes to said tracer device.

References Cited by the Examiner
UNITED STATES PATENTS

| | | | |
|---|---|---|---|
| 2,234,320 | 3/1941 | Rosen | 90—62 |
| 2,332,533 | 10/1943 | Roehm | 90—62 |
| 2,490,150 | 12/1949 | Newton | 90—13 X |
| 2,735,342 | 2/1956 | Glaser | 90—62 |
| 2,737,237 | 3/1956 | Herzegh | 80—13.5 X |
| 2,761,356 | 9/1956 | Scherrer | 90—13.5 |
| 2,856,823 | 10/1958 | Knuttel | 90—13.4 X |
| 2,890,628 | 1/1959 | Jouachim | 90—11 |
| 2,935,102 | 5/1960 | Potter. | |
| 3,055,393 | 9/1962 | Weaver | 90—62 X |
| 3,084,603 | 4/1963 | Jenkins | 90—13 |
| 3,117,493 | 1/1964 | Zwick et al. | 90—11 |
| 3,119,306 | 1/1964 | Colonius et al. | 90—13.5 |

FOREIGN PATENTS

| | | |
|---|---|---|
| 1,015,299 | 9/1957 | Germany. |

WILLIAM W. DYER, Jr., *Primary Examiner.*

LEON PEAR, *Examiner.*